United States Patent [19]

Plachetta et al.

[11] Patent Number: 5,374,675
[45] Date of Patent: Dec. 20, 1994

[54] THERMOPLASTIC MOLDING MATERIALS CONTAINING INORGANIC SUBGROUP METAL SALTS

[75] Inventors: Christoph Plachetta, Limburgerhof; Karl Schlichting, Bobenheim-Roxheim; Martin Welz, Bad Duerkheim; Theresa A. Bright, Mannheim, all of Germany

[73] Assignee: BASF Aktiengesellschaft, Ludwigshafen, Germany

[21] Appl. No.: 105,667

[22] Filed: Aug. 13, 1993

Related U.S. Application Data

[62] Division of Ser. No. 953,625, Sep. 30, 1992, abandoned.

[30] Foreign Application Priority Data

Oct. 5, 1991 [DE] Germany ............................ 4133124

[51] Int. Cl.$^5$ ............................................. C08K 3/30
[52] U.S. Cl. ............................... 524/403; 430/616; 430/617; 430/945; 524/413; 524/419
[58] Field of Search ........................ 523/136, 137, 122; 524/413, 403, 419; 430/541, 542, 945, 616, 617; 424/609

[56] References Cited

U.S. PATENT DOCUMENTS

| | | | |
|---|---|---|---|
| 2,981,640 | 4/1961 | Hill | 423/366 |
| 3,420,669 | 1/1969 | Sutherns et al. | 430/616 |
| 3,422,183 | 1/1969 | Ellison | 524/403 |
| 3,507,656 | 4/1970 | Sincius | 430/616 |
| 3,513,146 | 5/1970 | Naarmann | 524/413 |
| 3,519,595 | 7/1970 | Hermann et al. | 524/413 |
| 3,658,534 | 4/1972 | Ishitani et al. | 430/541 |
| 3,819,577 | 6/1974 | McRowe | 524/413 |
| 4,156,679 | 5/1979 | Sudre | 524/405 |
| 4,191,579 | 3/1980 | Hails et al. | 524/561 |
| 4,206,100 | 6/1980 | Kyo et al. | 524/403 |
| 5,053,440 | 10/1991 | Schueler et al. | 523/137 |

FOREIGN PATENT DOCUMENTS

| | | |
|---|---|---|
| 190997 | 3/1986 | European Pat. Off. . |
| 400305 | 5/1990 | European Pat. Off. . |
| 1169122 | 8/1961 | Germany . |
| 3917294 | 11/1990 | Germany . |
| 1482091 | 8/1977 | United Kingdom . |
| 2007235 | 5/1979 | United Kingdom . |
| 2010856 | 7/1979 | United Kingdom . |

OTHER PUBLICATIONS

Rompps Chemie-Lexi Kon-Otto-Albrecht Neumuller, editor, 3391, 4400, 4401, 4402 Franckh'sche Verlagshandlung, Stuttgart.

Primary Examiner—Veronica P. Hoke
Attorney, Agent, or Firm—Keil & Weinkauf

[57] ABSTRACT

Thermoplastic molding materials contain, as essential components,
A) from 30 to 99.995% by weight of a thermoplastic polymer,
B) from 0.005 to 5% by weight of an inorganic subgroup metal salt
and
C) from 0 to 69.995% by weight of fibrous or particulate fillers or a mixture thereof.

5 Claims, No Drawings

THERMOPLASTIC MOLDING MATERIALS CONTAINING INORGANIC SUBGROUP METAL SALTS

This application is a division of application Ser. No. 07/953,625, filed on Sep. 30, 1992 now abandoned.

The present invention relates to thermoplastic molding materials containing, as essential components, A) from 30 to 99.995% by weight of a thermoplastic polymer, B) from 0.005 to 5% by weight of an transition metal salt and C) from 0 to 69.995% by weight of fibrous or particulate fillers or a mixture thereof.

The present invention furthermore relates to the use of these thermoplastic molding materials for the production of laser-inscribable moldings and to the thus obtainable laser-inscribable moldings consisting of the thermoplastic molding materials.

Laser-inscribable moldings are used in many areas, for example in electronics and in the electrical sector.

EP-A 190 997 discloses a process for inscribing high molecular weight organic material, certain inorganic or organic pigments or polymer-soluble dyes being used as additives. However, such materials have poorer mechanical properties and poorer processing properties than products without additives.

The laser-inscribable, highly polymeric materials which are described in DE-A 39 17 294 and into which copper hydroxide phosphate, molybdenum oxide or titanium dioxide has been introduced as an additive have the same disadvantage.

It is an object of the present invention to provide thermoplastic molding materials which are suitable for the production of laser-inscribable moldings and at the same time have good mechanical properties and good processing properties.

We have found that this object is achieved, according to the invention, by the thermoplastic molding materials defined at the outset. We have also found the laser-inscribable moldings which are obtainable in this manner and consist of the thermoplastic molding materials.

The novel thermoplastic molding materials contain, as component A), from 30 to 99.995, preferably from 40 to 99.99, in particular from 50 to 99.95, % by weight of a thermoplastic polymer.

Examples of suitable thermoplastic polymers are thermoplastic polyesters, polyolefins, styrene polymers or mixtures thereof.

Thermoplastic polyesters are known per se. Preferably used polyesters are those which contain an aromatic ring in the main chain. The aromatic ring can also be substituted, for example by halogens, such as chlorine and bromine, and/or by $C_1$–$C_4$-alkyl, e.g. methyl, ethyl, isopropyl, n-propyl, isobutyl, n-butyl or tert-butyl.

The polyesters can be prepared by reacting dicarboxylic acids, esters thereof or other ester-forming derivatives with dihydroxy compounds in a conventional manner.

Examples of suitable dicarboxylic acids are aliphatic and aromatic dicarboxylic acids, which may also be used as a mixture. Naphthalenedicarboxylic acids, terephthalic acid, isophthalic acid, adipic acid, azelaic acid, sebacic acid, dodecanedioic acid and cyclohexanedicarboxylic acids, mixtures of these carboxylic acids and ester-forming derivatives thereof are mentioned here merely as examples.

Preferably used dihydroxy compounds are diols of 2 to 10 carbon atoms, particularly preferably ethylene glycol, 1,3-propanediol, 1,4-butanediol, 1,4-butenediol and 1,6-hexanediol; however, 1,4-hexanediol, 1,4-cyclohexanediol, 1,4-di-(hydroxymethyl)-cyclohexane, bisphenol A, neopentylglycol, mixtures of these diols and ester-forming derivatives thereof may also be used.

Polyesters obtained from terephthalic acid or naphthalenedicarboxylic acids and a $C_2$–$C_6$-diol component, for example polyethylene terephthalate, polyethylene naphthalate, polypropylene terephthalate or polybutylene terephthalate or mixtures thereof, are particularly preferred.

It is of course also possible to use polyester block copolymers, such as copolyetheresters. Such products are known per se and are described in the literature, for example in U.S. Pat. No. 3,651,014. Corresponding products are commercially available, for example Hytrel® (Du Pont).

The preferred polyolefins are those which are derived from alkenes of 2 to 10 carbon atoms. The alkenes may be linear or branched. Alk-1-enes are preferably used as monomers, homopolymers or copolymers of ethylene or propylene being particularly preferred.

For example, polyethylenes prepared by the high, medium or low pressure process and having densities of from 0.91 to 0.97 g/cm$^3$ or copolymers of ethylene, for example with vinyl esters, such as vinyl acetate or vinyl propionate, with acrylates or with propylene are suitable. The comonomer content of the ethylene copolymers is from 1 to 65, preferably from 10 to 45, % by weight. The melt flow index of the ethylene polymers may vary within a wide range and is preferably from 0.5 to 40 g/10 min (MFI 190° C./2.16 kg load). A preferred polyolefin is high density polyethylene (range from 0.94 to 0.97 g/cm$^3$), prepared by the Phillips process (medium pressure process). Another preferred polyolefin is linear low density polyethylene (range from 0.91 to 0.94 g/cm$^3$), prepared by the gas phase process. Filler-containing polyethylene should also be mentioned, the preferred filler in this case being calcium carbonate, which is present in the form of chalk and particularly preferably has a mean particle diameter of from 0.1 to 20 μm.

Polypropylene which can be prepared, for example, by the gas phase process using Ziegler-Natta catalysts and has a melt flow index (MFI 190° C./5 kg load) of from 0.1 to 90 g/10 min may also be mentioned. Other examples are propylene copolymers, which in turn preferably consist of from 20 to 65% by weight of propylene homopolymer and from 35 to 80% by weight of random propylene copolymer containing polymerized $C_2$–$C_{10}$-alk-1-enes. A propylene copolymer containing from 35 to 65% by weight of a random propylene copolymer in addition to from 35 to 65% by weight of a propylene homopolymer is preferred. The random propylene copolymer contains polymerized $C_2$–$C_{10}$-alkenes, for example ethylene, but-1-ene, pent-1-ene, hex-1-ene or oct-1-ene or a mixture of these comonomers, ethylene or but-1-ene being preferably used. The amount of comonomers in the random propylene copolymer should be such that the comonomer content of the propylene copolymer is not less than 15, preferably not less than 20, % by weight.

These propylene copolymers are prepared by polymerization with the aid of Ziegler-Natta catalysts, preferably in the gas phase using the polymerization reactors conventionally employed in industry.

In general, processes for the preparation of polyolefins are known and are described in, for example, Ullmanns Encyklopädie der technischen Chemie, 4th Edition, Volume 19, pages 167 to 226.

Styrene polymers are understood as being homo- or copolymers of styrene, particularly suitable copolymers being those with one of the closely related, in particular methyl-substituted styrenes in which a methyl radical is present on the organic ring or on the side chain. Particular examples of these are p-methylstyrene and α-methylstyrene. These copolymers can be prepared in a known manner from styrene or substituted styrene. Other suitable styrene polymers are tough graft copolymers which are prepared by polymerization of styrene or substituted styrene in the presence of a rubber, for example of a butadiene polymer or of a rubber-like styrene/butadiene polymer. The polybutadiene content may be from 3 to 20, preferably from 5 to 12, % by weight, based on the styrene polymer. The rubber (flexible phase) grafted with styrene is present in finely dispersed form in a polystyrene phase referred to as the rigid matrix. The preparation of such high impact polystyrenes is likewise known. Polystyrenes and polymers of substituted styrenes, as well as the high impact polystyrenes, are commercially available. The intrinsic viscosities of the styrene polymers are in general from 60 to 120 ml/g (measured in 0.5% strength solution in toluene at 23° C.).

The novel thermoplastic molding materials contain, as component B), from 0.005 to 5, preferably from 0.01 to 2, in particular from 0.05 to 1, % by weight of an inorganic transition metal salt.

Among the inorganic subgroup metal salts, those in which the transition metal has an electron configuration of from $d^6$ to $d^{10}$, preferably $d^{10}$, have proven particularly suitable, i.e. Cu, Ag and Au, in particular Cu and Ag. Furthermore, the halides, pseudohalides and sulfates are preferred inorganic subgroup metal salts. The pseudohalides include linear anions, such as cyanide, fulminate, cyanate, thiocyanate and azide, and nonlinear anions, such as dicyanamide, dicyanophosphide, tricyanomethanide and nitrosodicyanomethanide. Chlorides, bromides, thiocyanates and sulfates are particularly preferred examples.

The novel thermoplastic molding materials may furthermore contain, as component C), from 0 to 69.995, preferably from 0 to 50, % by weight of fibrous or particulate fillers or a mixture thereof. These are as a rule conventional additives and processing assistants, such as stabilizers, antioxidants, heat stabilizers, colorants, such as dyes and pigments, fibrous and pulverulent fillers and reinforcing agents, nucleating agents, plasticizers, etc.

Examples of antioxidants and heat stabilizers are halides of metals of group I of the Periodic Table, for example sodium halides, potassium halides and/or lithium halides, if necessary in conjunction with copper(I) halides, for example chlorides, bromides or iodides, sterically hindered phenols, hydroquinones, aromatic secondary amines, such as diphenylamines, various substituted members of these groups and mixtures thereof, in concentrations of up to 1% by weight, based on the weight of the thermoplastic molding material.

Examples of UV stabilizers, which are used in general in amounts of up to 2% by weight, based on the molding material, are various substituted resorcinols, salicylates, benzotriazoles and benzophenones.

Organic dyes, such as nigrosine, and pigments, such as titanium dioxide, cadmium sulfide, cadmium selenide, phthalocyanines, ultramarine blue and carbon black, may also be added, as well as fibrous and pulverulent fillers and reinforcing agents. Examples of the latter are carbon fibers, glass fibers, amorphous silica, asbestos, calcium silicate (wollastonite), aluminum silicate, magnesium carbonate, kaolin, chalk, powdered quartz, mica and feldspar. The amount of such fillers and dyes is in general up to 50, preferably from 20 to 35, % by weight.

For example, talc, calcium fluoride, sodium phenylphosphinate, alumina and finely divided polytetrafluoroethylene can be used as nucleating agents.

Examples of plasticizers are dioctyl phthalate, dibenzyl phthalate, butyl benzyl phthalate, hydrocarbon oils, N-n-butylbenzenesulfonamide and o- and p-tolylethylsulfonamide.

The novel thermoplastic molding materials may furthermore contain from 0 to 60, preferably from 0 to 40, % by weight of a toughened polymer (also referred to below as an elastomeric polymer or elastomer).

Preferred types of such elastomers are the ethylene/propylene (EPM) and ethylene/propylene/diene (EPDM) rubbers.

In general, EPM rubbers have virtually no double bonds whereas EPDM rubbers may have from 1 to 20 double bonds/100 carbon atoms.

Examples of diene monomers for EPDM rubbers are conjugated dienes, such as isoprene and butadiene, non-conjugated dienes of 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadienes, cyclohexadienes, cyclooctadienes and dicyclopentadiene, and alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0.2.6]-3,8-decadiene, or mixtures thereof. Hexa-1,5-diene, 5-ethylidenenorbornene and dicyclopentadiene are preferred. The diene content of the EPDM rubbers is preferably from 0.5 to 50, in particular from 1 to 8, % by weight, based on the total weight of the rubber.

EPM and EPDM rubbers can preferably also be grafted with reactive carboxylic acids or derivatives thereof. Examples of these are acrylic acid, methacrylic acid and derivatives thereof, e.g. glycidyl (meth)acrylate and maleic anhydride.

A further group of preferred rubbers are copolymers of ethylene with acrylic acid and/or methacrylic acid and/or the esters of these acids. In addition, the rubbers may contain dicarboxylic acids, such as maleic acid and fumaric acid, or derivatives of these acids, for example esters and anhydrides, and/or epoxy-containing monomers. These dicarboxylic acid derivatives and epoxy-containing monomers are preferably incorporated in the rubber by adding to the monomer mixture monomers which contain dicarboxylic acid or epoxy groups and are of the general formula I or II or III or IV $$R^1C(COOR^2)=C(COOR^3)R^4 \qquad (I)$$

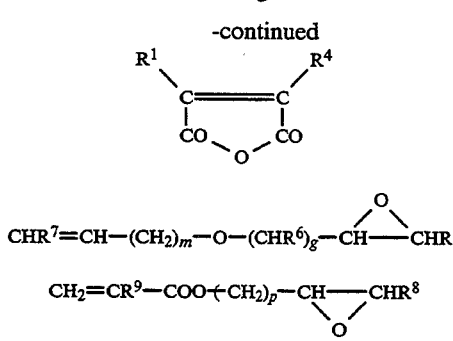

where $R^1$ to $R^9$ are each hydrogen or alkyl of 1 to 6 carbon atoms, m is an integer of from 0 to 20, g is an integer of from 0 to 10 and p is an integer of from 0 to 5.

$R^1$ to $R^9$ are each preferably hydrogen, m being 0 or 1 and g being 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and epoxy-containing esters of acrylic acid and/or methacrylic acid, such as glycidyl acrylate, glycidyl methacrylate and the esters with tertiary alcohols, such as tert-butyl acrylate. Although the latter have no free carboxyl groups, their behavior is similar to that of the free acids and they are therefore referred to as monomers having latent carboxyl groups.

The copolymers advantageously consist of from 50 to 98% by weight of ethylene, from 0.1 to 20% by weight of epoxy-containing monomers and/or methacrylic acid and/or monomers containing acid anhydride groups and the residual amount of (meth)acrylates.

Copolymers of from 50 to 98, in particular from 55 to 95, % by weight of ethylene, from 0.1 to 40, in particular from 0.3 to 20, % by weight of glycidyl acrylate and/or glycidyl methacrylate, (meth)acrylic acid and/or maleic anhydride and from 1 to 45, in particular from 10 to 40, % by weight of n-butyl acrylate and/or 2-ethylhexyl acrylate are particularly preferred.

Further preferred esters of acrylic and/or methacrylic acid are the methyl, ethyl, propyl, isobutyl and tert-butyl esters.

Vinyl esters and vinyl ethers may also be used as comonomers.

The ethylene copolymers described above can be prepared by conventional processes, preferably by random copolymerization under high pressure and at elevated temperature. Appropriate processes are generally known.

Other preferred elastomers are emulsion polymers whose preparation is described, for example, by Blackley in the monograph Emulsion Polymerization. The emulsifiers and catalysts which can be used are known per se.

In principle, homogeneous elastomers or those having a shell structure may be used. The shell-like structure is determined by the order of addition of the individual monomers; the morphology of the polymers, too, is influenced by this order of addition.

Acrylates, for example n-butyl acrylate and 2-ethylhexyl acrylate, corresponding methacrylates, butadiene and isoprene and mixtures thereof may be mentioned here merely as typical examples of monomers for the preparation of the rubber part of the elastomers. These monomers can be copolymerized with further monomers, e.g. styrene, acrylonitrile, vinyl ethers and further acrylates or methacrylates, such as methyl methacrylate, methyl acrylate, ethyl acrylate and propyl acrylate.

The flexible or rubber phase (having a glass transition temperature of less than 0° C.) of the elastomers can form the core, the outer shell or a middle shell (in the case of elastomers having more than a two-shell structure); for multishell elastomers, a plurality of shells may also consist of a rubber phase.

If one or more rigid components (having glass transition temperatures of more than 20° C.) are present in the elastomer in addition to the rubber phase, said components are generally prepared by polymerizing styrene, acrylonitrile, methacrylonitrile, α-methylstyrene, p-methylstyrene, acrylates and methacrylates, such as methyl acrylate, ethyl acrylate and methyl methacrylate, as main monomers. Here too, small amounts of further comonomers may also be used.

In some cases, it has proven advantageous to use emulsion polymers which have reactive groups at the surface. Such groups are, for example, epoxy, carboxyl, latent carboxyl, amino or amido groups and functional groups which can be introduced by the concomitant use of monomers of the general formula

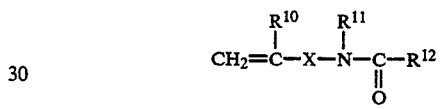

where $R^{10}$ is hydrogen or $C_1$-$C_4$-alkyl, $R^{11}$ is hydrogen, $C_1$-$C_8$-alkyl or aryl, in particular phenyl, $R^{12}$ is hydrogen, $C_1$-$C_{10}$-alkyl, $C_6$-$C_{12}$-aryl or —$OR^{13}$, $R^{13}$ is a $C_1$-$C_8$-alkyl or $C_6$-$C_{12}$-aryl group which may be substituted by O- or N-containing groups, X is a chemical bond, $C_1$-$C_{10}$-alkylene or $C_6$-$C_{12}$-arylene or

Y is O—Z— or NH—Z and Z is $C_1$-$C_{10}$-alkylene or $C_6$-$C_{12}$-arylene.

The graft monomers described in EP-A 208 187 are also suitable for introducing reactive groups at the surface.

Acrylamide, methacrylamide and substituted esters of acrylic acid or methacrylic acid, such as N-tert-butylaminoethyl methacrylate, N,N-dimethylaminoethyl acrylate, N,N-dimethylaminomethyl acrylate and N,N-diethylaminoethyl acrylate, are further examples.

The particles of the rubber phase may also be cross-linked. Examples of crosslinking monomers are buta-1,3-diene, divinylbenzene, diallyl phthalate and dihydrodicyclopentadienyl acrylate as well as the compounds described in EP-A 50 265.

Graft-linking monomers may also be used, i.e. monomers having two or more polymerizable double bonds which react at different rates in the polymerization. Preferably used compounds are those in which at least one reactive group undergoes polymerization at about the same rate as the other monomers while the other reactive group (or reactive groups), for example, undergoes (undergo) polymerization substantially more slowly. The different polymerization rates result in a certain content of unsaturated double bonds in the rubber. If a further phase is subsequently grafted onto such a rubber, some or all of the double bonds present in the rubber react with the graft monomers with formation of chemical bonds, i.e. the grafted phase is at least partially linked to the grafting base via chemical bonds.

Examples of such graft-linking monomers are allyl-containing monomers, in particular allyl esters of ethylenically unsaturated carboxylic acids, such as allyl acrylate, allyl methacrylate, diallyl maleate, diallyl fumarate, diallyl itaconate or the corresponding mono-allyl compounds of these carboxylic acids. There is also a large number of further suitable graft-linking monomers; for further details, reference may be made here to, for example, U.S. Pat. No. 4,148,846.

In general, the amount of these crosslinking monomers in the polymeric impact modifier is up to 5, preferably not more than 3, % by weight, based on E).

Some preferred emulsion polymers are shown below. Graft polymers which possess a core and at least one outer shell and have the following composition may first be mentioned here:

| Type | Monomers for the core | Monomers for the shell |
|---|---|---|
| I | Buta-1,3-diene, isoprene, n-butyl acrylate, ethylhexyl acrylate or mixtures thereof | Styrene, acrylonitrile, methyl methacrylate |
| II | As for I but with the use of crosslinking agents | As for I |
| III | As for I or II | n-Butyl acrylate, ethyl acrylate, methyl acrylate, buta-1,3-diene, isoprene, ethylhexyl acrylate |
| IV | As for I or II | As for I or III but with the use of monomers having reactive groups as described herein |
| V | Styrene, acrylonitrile, methyl methacrylate or mixtures thereof | First shell of monomers as described under I and II for the core Second shell as described under I or IV for the shell |

Instead of graft polymers having a multishell structure, homogeneous, i.e. one-shell, elastomers of buta-1,3-diene, isoprene and n-butyl acrylate or copolymers thereof may also be used. These products too can be prepared by the concomitant use of crosslinking monomers or monomers having reactive groups.

Examples of preferred emulsion polymers are n-butyl acrylate/(meth)acrylic acid copolymers, n-butyl acrylate/glycidyl acrylate or n-butyl acrylate/glycidyl methacrylate copolymers, graft polymers having an inner core of n-butyl acrylate or based on butadiene and an outer shell of the abovementioned copolymers and copolymers of ethylene with comonomers which donate reactive groups.

The elastomers described can also be prepared by other conventional processes, for example by suspension polymerization.

Further preferred rubbers are polyurethanes, as described in EP-A 115 846, EP-A 115 847, EP-A 116 456, EP-A 117 664 and EP-A 327 384. Such products are commercially available, for example, under the names Desmopan ® (Bayer AG) or Elastollan ® (Elastogran Polyurethane GmbH).

Silicone rubbers, as described in DE-A 37 25 576, EP-A 235 690, DE-A 38 00 603 and EP-A 319 290, are also preferred.

It is of course also possible to use mixtures of the abovementioned rubber types.

The novel thermoplastic molding materials may furthermore contain flameproofing agents, which as a rule are used in amounts of from 0 to 30% by weight.

All known flameproofing agents are suitable, for example polyhalobiphenyl, polyhalodiphenyl ethers, polyhalophthalic acid and derivatives thereof, polyhalo-oligocarbonates and polyhalopolycarbonates, the corresponding bromine compounds being particularly effective.

Examples of these are polymers of 2,6,2',6'-tetrabromobisphenol A, of tetrabromophthalic acid, of 2,6-dibromophenol and of 2,4,6-tribromophenol and of derivatives thereof.

A preferred flameproofing agent is elemental phosphorus. As a rule, the elemental phosphorus can be desensitized or coated with, for example, polyurethanes and other aminoplasts. Masterbatches of red phosphorus, for example in a polyamide, elastomer or polyolefin, are also suitable.

1,2,3,4,7,8,9,10,13,13,14,14-dodecachloro-1,4,4a,5,6-,6a,7,10,10a,11,12,12a-dodecahydro-1,4:7,10-dimethanodibenzo[a,e]cyclooctane (Dechlorane ® Plus, Occidental Chemical Corp.) and, if required, a synergistic agent, e.g. antimony trioxide, are particularly preferred.

Further phosphorus compounds, such as organic phosphoric acid, phosphinates, phosphonates, phosphinites, phosphine oxides, phosphines, phosphites or phosphates are likewise preferred. An example is triphenylphosphine oxide. This may be used alone or as a mixture with red phosphorus.

Typical of the preferred phosphorus compounds which may be used in the present invention are those of the following general formula

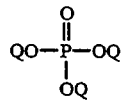

where the radicals Q are identical or different hydrocarbon radicals, such as alkyl, cycloalkyl, aryl, alkyl-substituted aryl or aryl-substituted alkyl, or halogen, hydrogen or a combination thereof, provided that at least one of the radicals Q is aryl. Examples of such suitable phosphates are the following: phenyl bisdodecyl phosphate, phenyl bisneopentyl phosphate, phenyl ethylene hydrogen phosphate, phenyl bis-(3,5,5'-trimethylhexyl) phosphate, ethyl diphenyl phosphate, 2-ethylhexyl di-p-tolyl phosphate, diphenyl hydrogen phosphate, bis-(2-ethylhexyl) phenyl phosphate, tri-(nonylphenyl) phosphate, phenyl methyl hydrogen phosphate, triphenyl phosphate, dibutyl phenyl phosphate and diphenyl hydrogen phosphate. The preferred phosphates are those in which each radical Q is aryl. The most preferred phosphate is triphenyl phosphate. The combination of triphenyl phosphate with triphenylphosphine oxide is also preferred.

Other suitable flameproofing agents are compounds which contain phosphorus-nitrogen bonds, such as phosphononitrile chloride, phosphoric ester amides, phosphoric ester amines, phosphoramides, phosphonamides, phosphinamides, trisaziridinylphosphine oxide or tetrakis(hydroxymethyl)phosphonium chloride.

These flame-retardant additives are for the most part commercially available.

Further halogen-containing flameproofing agents are tetrabromobenzene, hexachlorobenzene and hexabromobenzene, as well as halogenated polystyrenes and polyphenyl ethers.

The halogenated phthalimides described in DE-A 19 46 924 can also be used. Among these, N,N'-ethylenebistetrabromophthalimide has become particularly important.

The flameproofing agents may be used together with synergistic agents, metal oxides, metal borates or mixtures thereof being preferred. Suitable metal oxides are in general zinc oxides, lead oxides, iron oxides, aluminum oxides, tin oxides, magnesium oxides or mixtures thereof. Antimony trioxide and antimony pentoxide and mixtures thereof are preferred. Suitable metal borates are borates of metals of the 1st to 3rd main group of the Periodic Table and of the 1st to 8th subgroup, anhydrous zinc borates being preferred. A mixture of antimony trioxide with anhydrous zinc borate is preferably used. The amount of synergistic agents is as a rule from 0 to 30% by weight, based on the thermoplastic molding material.

The novel thermoplastic molding materials can be prepared by conventional methods, by mixing the starting components in a conventional mixing apparatus, such as a screw extruder, a Brabender mill or a Banbury mill, and then carrying out extrusion. After extrusion, the extrudate is cooled and comminuted. The mixing temperatures are usually from 180° to 300° C., depending on the thermoplastic polymer used.

The novel thermoplastic molding materials have good mechanical properties and good processing properties and are particularly suitable for the production of laser-inscribable moldings.

EXAMPLES

Examples 1 to 4

99.9% by weight of a polybutylene terephthalate (PBT) having an intrinsic viscosity of 130 ml/g, measured in a 0.5% strength by weight solution in phenol and o-dichlorobenzene (weight ratio 1:1) at 23° C. (Ultradur ® B 4500 from BASF AG), were mixed with 0.1% by weight each of CuCl (Example 1), CuBr (Example 2), anhydrous CuSO$_4$ (Example 3) and CuSCN (Example 4) in a twin-screw extruder (ZSK 53 from Werner & Pfleiderer) at 260° C., the mixture was extruded and the extrudate was cooled and granulated.

Comparative Example V1

100% by weight of the polybutylene terephthalate used in Examples 1 to 4 were extruded and the extrudate was cooled and granulated.

The modulus of elasticity was determined according to DIN 53,457 and the tensile strength $\sigma_B$ according to DIN 53,455. The notched impact strength $a_k$ was determined according to DIN 53,453 at 23° C. and the temperature of the beginning of crystallization $T_{CB}$ was determined from DSC (Differential Scanning Calorimetry) measurements. The Melt Volume Index MVI was determined at 250° C. and under a 2.16 kg load according to DIN 53,753.

Laser inscription

Laser inscription was carried out by the vector method, a laser beam being guided by two computer-controlled rotating mirrors moved by galvanometers, so that the desired inscription was made in the inscription plane (=focal plane of the focusing lens). The laser source used was a 50 W multimode Nd:YAG solid state laser having a wavelength of 1.06 μm. The beam diameter at the focus was 100 μm. The contrast was determined visually, the rating ranging from 1 (very good) to 6 (very poor).

The compositions and properties are summarized in Table 1.

TABLE 1

| | PBT with various additives | | | | |
|---|---|---|---|---|---|
| | Example 1 | Example 2 | Example 3 | Example 4 | Comp. Ex. VI |
| Composition | 99.9% by wt. PBT 0.1% by wt. CuCl | 99.9% by wt. PBT 0.1% by wt. CuBr | 99.9% by wt. PBT 0.1% by wt. CuSO$_4$ | 99.9% by wt. PBT 0.1% by wt. CuSCN | 100% by wt. PBT |
| Modulus of elasticity | 2,500 | 2,500 | 2,500 | 2,500 | 2,400 |
| $G_B$ [N/mm$^2$] | 60 | 60 | 60 | 60 | 60 |
| $a_k$ [kJ/m$^2$] | no fracture | no fracture | no fracture | no fracture | no fracture |
| $T_{CB}$ [°C.] | 195 | 195 | 195 | 200 | 195 |
| MVI [ml/10 min] | 29 | 25 | 30 | 29 | 25 |
| Contrast rating | 3 | 4 | 4 | 2 | 4–5 |

Examples 5 to 8

A polybutylene terephthalate (PBT) having an intrinsic viscosity of 124 ml/g, measured in a 0.5% strength by weight solution in phenol and o-dichlorobenzene (weight ratio 1:1) at 23° C. (Ultradur ® 4520 from BASF AG), was processed with different amounts of CuSCN as described in Examples 1 to 4.

Comparative Example V2

100% by weight of the polybutylene terephthalate used in Examples 5 to 8 were extruded and the extrudate was cooled and granulated.

The intrinsic viscosities IV were determined as described in Examples 5 to 8 for polybutylene terephthalate. The contrast was rated as described under Examples 1 to 4.

The compositions and properties are summarized in Table 2.

TABLE 2

| | PBT with different amounts of CuSCN | | | | |
|---|---|---|---|---|---|
| | Example 5 | Example 6 | Example 7 | Example 8 | Comp. Ex. V2 |
| PBT [% by wt.] | 99.9 | 99.8 | 99.6 | 99.2 | 100 |
| CuSCN | 0.1 | 0.2 | 0.4 | 0.8 | — |

TABLE 2-continued

| | PBT with different amounts of CuSCN | | | | |
|---|---|---|---|---|---|
| [% by wt.] | Example 5 | Example 6 | Example 7 | Example 8 | Comp. Ex. V2 |
| IV [ml/g] | 128 | 128 | 128 | 127 | 124 |
| Contrast rating | 2 | 2–3 | 1 | 1 | 3–4 |

Examples 9 to 12

99.9% by weight of a polypropylene (PP) having a density of 0.908 g/cm² and a melt volume index MVI (230° C./2.16 kg) of 11 ml/10 rain (Novolen ® 1100N from BASF AG) were mixed with 0.01% by weight each of CuCl (Example 9), CuBr (Example 10), anhydrous CuSO₄ (Example 11) and CuSCN (Example 12) in a twin-screw extruder (ZSK 53 from Werner & Pfleiderer) at 240° C., the mixture was extruded and the extrudate was cooled and granulated.

Comparative Example V3

100% by weight of the polypropylene used in Examples 9 to 12 were extruded and the extrudate was cooled and granulated.

The compositions and properties are summarized in Table 3.

TABLE 3

| | PP with various additives | | | | |
|---|---|---|---|---|---|
| | Example 9 | Example 10 | Example 11 | Example 12 | Comp. Ex. V3 |
| Composition | 99.9% by wt. PP 0.1% by wt. CuCl | 99.9% by wt. PP 0.1% by wt. CuBr | 99.9% by wt. PP 0.1% by wt. CuSO₄ | 99.9% by wt. PP 0.1% by wt. CuSCN | 100% by wt. PP |
| MVI (230° C./2.16 kg) [ml/10 min] | 15 | 15 | 15 | 15 | 15 |
| Contrast rating | 3 | 3 | 4 | 3 | 5 |

We claim:

1. A thermoplastic molding material containing, as essential components,
   A) from 30 to 99.995% by weight of a thermoplastic polymer selected from the group consisting of thermoplastic polyesters, polyolefins, styrene polymers and mixtures thereof,
   B) from 0.005 to 5% by weight of a transition metal thiocyanate and
   C) from 0 to 69.995% by weight of fibrous or particulate fillers or a mixture thereof.

2. A thermoplastic molding material as claimed in claim 1, wherein an inorganic subgroup metal salt is used as component B), the transition metal having an electron configuration of from $d^6$ to $d^{10}$.

3. A laser-inscribable molding obtainable from a thermoplastic molding material as claimed in claim 1 as an essential component.

4. The molding material of claim 1 wherein the metal thiocyanate is selected from the group consisting of CuSCN, AgSCN and AuSCN.

5. The molding material of claim 4 wherein the metal thiocyanate is CuSCN.

* * * * *

UNITED STATES PATENT AND TRADEMARK OFFICE
CERTIFICATE OF CORRECTION

PATENT NO.: 5,374,675

DATED: December 20, 1994

INVENTOR(S): PLACHETTA et al.

It is certified that error appears in the above-identified patent and that said Letters Patent is hereby corrected as shown below:

On the title page, item [62], "Division" should be --Continuation--.

Signed and Sealed this

Ninth Day of May, 1995

Attest:

BRUCE LEHMAN

Attesting Officer

Commissioner of Patents and Trademarks